(12) United States Patent
Ionescu et al.

(10) Patent No.: US 10,331,881 B2
(45) Date of Patent: *Jun. 25, 2019

(54) USER-MODE COMPONENT INJECTION TECHNIQUES

(71) Applicant: CrowdStrike, Inc., Irvine, CA (US)

(72) Inventors: Ion-Alexandru Ionescu, Seattle, WA (US); Loren C. Robinson, West Deptford, NJ (US)

(73) Assignee: CrowdStrike, Inc., Irvine, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/077,526

(22) Filed: Mar. 22, 2016

(65) Prior Publication Data

US 2017/0039367 A1 Feb. 9, 2017

Related U.S. Application Data

(63) Continuation-in-part of application No. 14/818,527, filed on Aug. 5, 2015, now Pat. No. 10,025,922.

(51) Int. Cl.
*G06F 21/52* (2013.01)
*G06F 21/55* (2013.01)
*G06F 9/54* (2006.01)

(52) U.S. Cl.
CPC .............. *G06F 21/52* (2013.01); *G06F 9/547* (2013.01); *G06F 21/55* (2013.01); *G06F 2221/033* (2013.01)

(58) Field of Classification Search
CPC .... G06F 21/52; G06F 9/545; G06F 2221/034; G06F 21/55

(Continued)

(56) References Cited

U.S. PATENT DOCUMENTS 5,778,226 A 7/1998 Adams et al.
6,438,621 B1 8/2002 Kanamori et al.
(Continued)

FOREIGN PATENT DOCUMENTS

WO WO2008008401 A2 1/2008

OTHER PUBLICATIONS

Extended European Search Report dated Dec. 12, 2016 for European Patent Application No. 16179596.8, 6 pages.
(Continued)

*Primary Examiner* — Harunur Rashid
*Assistant Examiner* — Sakinah White Taylor
(74) *Attorney, Agent, or Firm* — Lee & Hayes, P.C.

(57) ABSTRACT

Techniques are described herein for loading a user-mode component of a security agent based on an asynchronous procedure call (APC) built by a kernel-mode component of the security agent. The APC is executed while a process loads, causing the process to load the user-mode component. The user-mode component then identifies slack space of the process, stores instructions in the slack space, and hooks function(s) of the process, including modifying instruction(s) of the function(s) to call the instructions stored in the slack space. When those modified instruction(s) call the stored instructions, the stored instructions invoke the user-mode component, which receives data from the hooked function(s). Also, the security agent may bypass a control-flow protection mechanism of the operating system by setting a pointer of the control-flow protection mechanism to point to an alternate verification function.

20 Claims, 6 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 6,823,460 | B1* | 11/2004 | Hollander | G06F 9/4425 |
| | | | | 710/260 |
| 7,971,255 | B1* | 6/2011 | Kc | G06F 21/566 |
| | | | | 713/164 |
| 8,214,900 | B1 | 7/2012 | Satish et al. | |
| 8,572,729 | B1 | 10/2013 | Lowe et al. | |
| 8,752,049 | B1 | 6/2014 | Backensto et al. | |
| 9,336,047 | B2 | 5/2016 | Busaba et al. | |
| 2004/0237071 | A1 | 11/2004 | Hollander et al. | |
| 2006/0075381 | A1 | 4/2006 | Laborczfalvi et al. | |
| 2007/0209032 | A1* | 9/2007 | Mihai | G01R 31/31837 |
| | | | | 717/126 |
| 2007/0250927 | A1* | 10/2007 | Naik | G06F 21/566 |
| | | | | 726/22 |
| 2008/0016314 | A1* | 1/2008 | Li | G06F 21/554 |
| | | | | 711/200 |
| 2009/0296685 | A1 | 12/2009 | O'Shea et al. | |
| 2010/0083275 | A1* | 4/2010 | Jayamohan | G06F 9/461 |
| | | | | 718/108 |
| 2010/0095281 | A1* | 4/2010 | Raber | G06F 9/4425 |
| | | | | 717/129 |
| 2010/0138843 | A1 | 6/2010 | Freericks et al. | |
| 2014/0137184 | A1 | 5/2014 | Russello et al. | |
| 2015/0378896 | A1 | 12/2015 | Greiner et al. | |
| 2016/0357958 | A1* | 12/2016 | Guidry | G06F 21/53 |
| 2017/0039366 | A1 | 2/2017 | Ionescu et al. | |

OTHER PUBLICATIONS

Mandt, "Kernel Attacks through User-Mode Callbacks", retrieved on Nov. 24, 2016 at «http://mista.nu.research/mandt-win32k-slides.pdf», Feb. 11, 2011, 108 pages.

Office action for U.S. Appl. No. 14/818,527, dated Feb. 10, 2017, Ionescu, "User-Mode Component Injection and Atomic Hooking", 27 pages.

Partial European Search Report dated May 2, 2017 for European Patent Application No. 17158611.8, 14 pages.

Extended European Search Report dated Aug. 22, 2017 for European Patent Application No. 17158611.8, 12 pages.

Hunt, et al., "Detours: Binary Interception of Win32 Functions", retrieved on Aug. 31, 2000 at «ftp://ftp.research.microsoft.com/pub/tr/tr-98-33.pdf», 1999, pp. 1-9.

Office action for U.S. Appl. No. 14/818,527, dated Oct. 3, 2017, Ionescu, "User-Mode Component Injection and Atomic Hooking", 28 pages.

* cited by examiner

USER-MODE COMPONENT INJECTION TECHNIQUES

RELATED APPLICATIONS

This patent application is a continuation-in-part of U.S. Non-provisional patent application Ser. No. 14/818,527, filed on Aug. 5, 2015. Application Ser. No. 14/818,527 is hereby incorporated by reference, in its entirety.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To aid in countering such threats, vendors of anti-virus software will often register hooks with an operating system of a monitored device or hook system library components (e.g., the NTDLL component in WINDOWS® operating systems, or glibc component on UNIX Systems) implemented in processes of the monitored device. Vendors of anti-virus software typically operate in user-mode, however, and cannot hook components implemented in processes until those processes are loaded. This delay provides security exploits with an opportunity to insert themselves into such processes and harden against detection by anti-virus software. Further, advances in operating systems, such as advances from 32-bit operating systems to 64-bit operating systems, may hinder the ability of anti-virus software to hook functions of certain components, such as 64-bit versions of system components operating in 32-bit application processes.

Hooking processes also can involve difficulties. The component hooking a process may have to deal with race conditions and be required to use thread suspension techniques in order to safely hook a function in such a process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for a kernel-mode component of a security agent to inject a user-mode component of the security agent that hooks one or more functions of a component of a user-mode process and provides data associated with those hooked function(s) to the kernel-mode component. The component of the user-mode process may be a system library component instantiated by the user-mode process, such as a 64-bit loader/initialization library, such as the NTDLL component on WINDOWS® operating systems. The injection may involve the kernel-mode component building an asynchronous procedure call (APC) and providing the APC to the dispatcher of operating system in order to cause user-mode process execution.

When executed, a kernel routine of the APC calls instructions to allocate memory and to store instructions in the allocated memory for loading the user-mode component. Following the kernel routine, a user routine of the APC calls the instructions stored in the allocated memory to load the user-mode component.

In some implementations, execution of the APC may involve bypassing a control-flow protection mechanism of the OS. The kernel-mode component may bypass the mechanism by setting a pointer to a verification function of the mechanism to point to an alternate verification function. The alternate verification function may be a function of the mechanism for, e.g., processes not compiled by one or more compiler types or may be a function of another component, such as a function of the user-mode component. After execution of the APC, a component in user-mode (e.g., the user-mode component) may reset the pointer to point to the verification function.

The user-mode component identifies slack space in the user-mode process, stores instructions (e.g., a trampoline) in the slack space, and hooks one or more functions of the component of the user-mode process. Such hooks may be atomic hooks that each modifies a single machine-word sized instruction, or a set of instructions that make up a machine word, (e.g., an 8-byte instruction on a 64-bit machine) in a function of the component to call the trampoline. In some implementations, there may be multiple hooked functions, each calling the same trampoline.

When a hooked function is executed, the modified instruction(s) call the trampoline, and the trampoline in turn invokes the user-mode component, which receives data associated with the hooked function (e.g., arguments of the function) and provides that data to the kernel-mode component. In some implementations, the trampoline invokes a redirect function of the user-mode component, and the redirect function redirects to one of a number of hooking functions corresponding to the hooked functions based on a return address retrieved from the call stack. The return address may be indicative of which hooked function called the trampoline. Upon being called by the redirect function, the appropriate hooking function receives the data and provides it to the kernel-mode component.

Thus, the user-mode component injection and atomic hook effectively enable a kernel-mode component to hook a component of the user-mode process. Such hooking may enable the kernel-mode component to obtain information about user-mode memory allocations, actors which set thread contexts in user-mode, or any system calls which cannot be directly hooked from within kernel-mode.

As used herein, "APC" may refer to APCs, to signals used in a Unix OS, or to any function pointer or pointers built in kernel mode and provided to a user-mode process or thread for execution.

Example Environment

Figure 1:
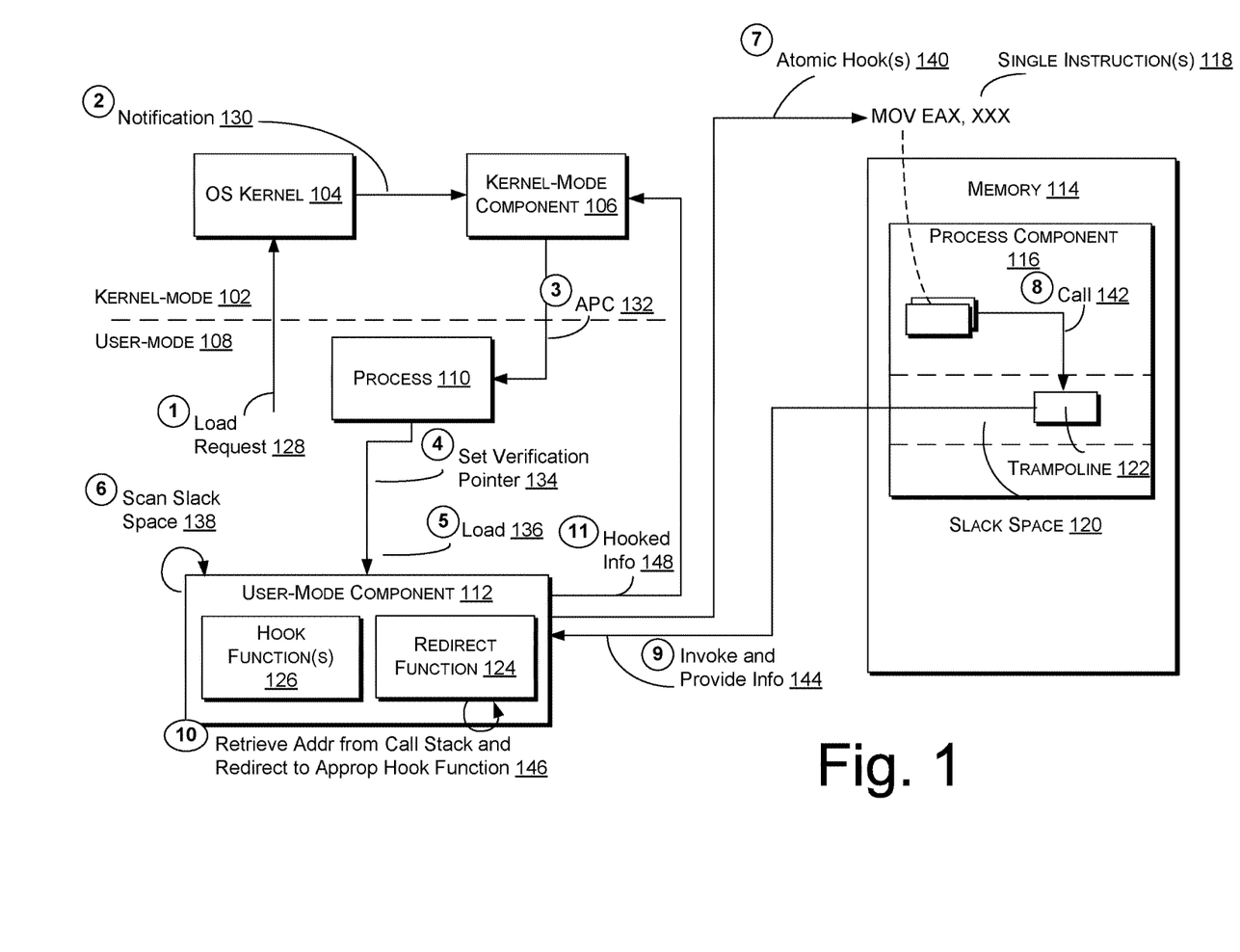
FIG. 1 illustrates an overview of multiple executable components and storage locations of components in memory, the multiple executable components including a kernel-mode component of a security agent, a user-mode component of that security agent, and a user-mode process.

FIG. 1 illustrates an overview of multiple executable components and storage locations of components in memory, the multiple executable components including a kernel-mode component of a security agent, a user-mode component of that security agent, and a user-mode process. As illustrated, multiple components may run in kernel-mode 102 of a computing device, such as an operating system (OS) kernel 104 and a kernel-mode component 106. Multiple components may also run in user-mode 108 of the computing device, such as a process 110 and a user-mode component 112. Memory 114 of the computing device may also store one or more of such components, such as a process component 116 of the process 110. Process component 116 includes one or more hooked functions with different instructions, such as single instruction(s) 118. Also, process component 116 in memory 114 includes slack space 120, and a location in the slack space 120 may store a trampoline 122 which, when called, invokes a redirect function 124 of the user-mode component 112. That redirect function 124 in turn redirects to a hooking function 126 of one or more hooking functions 126, each hooking function 126 associated with instruction(s) 118 of a hooked function.

As is further illustrated in FIG. 1, the OS kernel 104 may receive at 128 a load request for the process 110. At 130, the kernel-mode component 106 may then receive a notification of the load request from the OS kernel 104. Responsive to receiving the notification, the kernel-mode component 106 may build, at 132, an APC, and queue the APC to the main thread of process 110 for execution. When executed, the APC calls instructions that allocate memory, store in that allocated memory instructions for loading the user-mode component 112, set, at 134, a verification pointer of a control flow protection mechanism of the OS to point to an alternate verification function, and load, at 136, the user-mode component 112 by calling the instructions stored in the allocated memory. The user-mode component 112 then scans slack space 120 of the process component 116, stores the trampoline 122 in the slack space 120, and hooks, at 140, a single instruction or set of instructions for one or more functions (also referred to as the "hooked functions"), replacing the instruction(s) 118.

When one of those instruction(s) 118 is subsequently executed after modification, it calls, at 142, the trampoline 122 stored in slack space 120. The trampoline 122 then invokes, at 144, the redirect function 124 of the user-mode component 112. The redirect function 124 then, at 146, retrieves a return address from the call stack and redirects to a hooking function 126 based on that return address. The hooking function 126 receives data from the hooked function that called the trampoline 122 and, at 148, provides the hooked data to the kernel-mode component 106.

Figure 2:
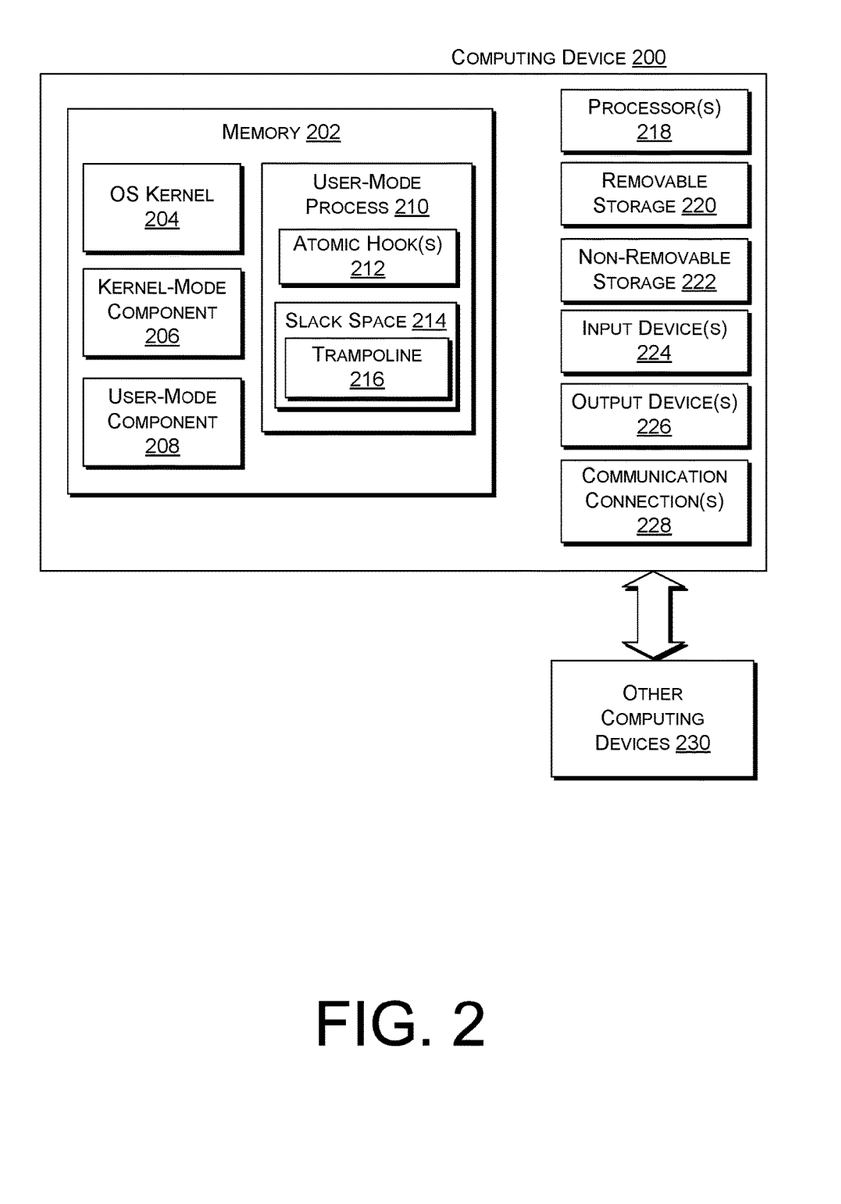
FIG. 2 illustrates a component level view of a computing device configured with a kernel-mode component of a security agent capable of injecting a user-mode component of that security agent to hook a user-mode process.

In various embodiments, a computing device may include the OS kernel 104, kernel-mode component 106, process 110, user-mode component 112, and memory 114. Such a computing device may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the OS kernel 104, kernel-mode component 106, process 110, user-mode component 112, and memory 114 may be distributed among the multiple computing devices. In some implementations, the computing device represents one or more virtual machines implemented on one or more computing devices. An example of a computing device including the OS kernel 104, kernel-mode component 106, process 110, user-mode component 112, and memory 114 is illustrated in FIG. 2 and described below with reference to that figure.

The OS kernel 104 may be a kernel of any sort of OS, such as a WINDOWS® OS, a Unix OS, or any other sort of OS. Such an OS may be a 64-bit OS or greater and may support both 32-bit processes and 64-bit processes with a 64-bit system library loader component, such as the 64-bit NTDLL component on WINDOWS® operating systems. The OS kernel 104 may have load and unload functions for loading and unloading components, such as the process 110. The OS kernel 104 also includes a number of computing device lists, such as a list of known library components (e.g., known dynamic link libraries (DLLs)).

Further, the OS may implement a control-flow protection mechanism, such as the control-flow guard implemented by the WINDOWS 10™ OS. Such a control flow mechanism may include a verification function that compares an address in a function call to a process to a list of known addresses associated with beginnings of functions of that process. If the address in the function call does not match a known address, the OS may disallow the function call. In some implementations, the verification function may be one of multiple verification functions of the control-flow protection mechanism. The verification function that compares a function call address to a list of known addresses may be utilized for processes compiled with one of one or more specific compiler types, and an alternate verification function, which may essentially permit any function calls, may be utilized for processes that are not compiled with any of the specific compiler types.

The kernel-mode component 106 may be a component of a kernel-level security agent, which may monitor and record activity on the computing device, may analyze the activity, and may generate alerts and events and provide those alerts and events to a remote security service. The kernel-level security agent may be installed and configurable by the remote security service, receiving, and applying while live, reconfigurations of the kernel-mode component 106 and other component(s) of the kernel-level security agent. The kernel-mode component 106 may be an actor component within an architecture of the kernel-level security agent and receive notification of a request to load the process 110 via an event source of the architecture of the kernel-level security agent, which may register with a callback interface of the OS kernel 104. An example kernel-level security agent is described in greater detail in U.S. patent application Ser. No. 13/492,672, entitled "Kernel-Level Security Agent" and filed on Jun. 8, 2012, which issued as U.S. patent number on May 26, 2015. As is described further herein, the kernel-mode component 106 receives notification of a request to load process 110, builds an APC, queues the APC to the main thread of process 110, and receives hooked data from the user-mode component 112.

In some implementations, the process 110 may be any sort of user-mode process of a computing device, such as an application or user-mode platform component. The process 110 may perform various operations, including various system calls, such as memory allocations or setting thread contexts. The process 110 may also instantiate one or more system library components for the purpose of performing system calls. For example, if the process 110 is a 64-bit process, the process 110 may instantiate the 64-bit NT DLL on WINDOWS® operating systems. If the process is a 32-bit process, the process 110 may instantiate both a 32-bit system call library and a 64-bit system call library. The process component 116 may be an example of such a system library component, such as the 64-bit NT DLL on WINDOWS® operating systems. The process component 116 may have one or more functions, such as functions for performing user-mode memory allocations. These functions may be comprised of instructions, such as the single instruction 118 or a set of instructions that make up a machine word (8 byte instructions, for example). The process 110 may also be configured to request pending APC delivery while loading and to cause the operating system to execute those APCs.

In various implementations, the user-mode component 112 may be any sort of component of the security agent and may be associated with the kernel-mode component 106. For example, the user-mode component 112 may be a library component, such as a DLL. The user-mode component 112 and instructions for loading it may be stored anywhere in memory 114. The user-mode component 112 may also be associated with a name, and the kernel-mode component 106 may add a name of that user-mode component 112 to a list of library components (e.g., Known DLLs on WINDOWS® operating systems) maintained by the OS kernel 104. As is further mentioned herein, the user-mode component 112 may identify slack space 120 in the process component 116, store the trampoline 122 in the slack space 120, hook functions of process component 116, receive hooked data, provide the hooked data to the kernel-mode component 106, and restore the single instruction 118 to its pre-modified state (of one or multiple instructions comprising a machine word). As is also shown, the user-mode component 112 includes a redirect function 124 invoked by the trampoline 122 and one or more hooking functions 126, each hooking function 126 corresponding to a hooked function of the process component 116. The redirect function 124 redirects to one of the hooking functions 126 based on a return address retrieved from the call stack, and the one of the hooking functions 126 receives the data from the hooked function and provides it to the kernel-mode component 106.

The memory 114 may be memory of any sort of memory device. Memory may have a fairly large address space (e.g., 128 terabytes). Examples of memory 114 are illustrated in FIG. 2 and described below in detail with reference to that figure.

In some implementations, the trampoline 122 may be any set of instructions that invokes (e.g., redirects to, calls, or requests loading of) the redirect function 124 of the user-mode component 112.

In various implementations, the OS kernel 104 may receive, at 128, a load request to load process 110 from a process or component of the computing device. Upon receiving the load request, the OS kernel 104 may begin to load the process 110 and provide, via a callback interface of the OS kernel 104, notifications to any processes or components registered with that callback interface. As mentioned above, the kernel-mode component 106 may be registered with the callback interface of the OS kernel 104 to receive, at 130, notification of load requests for loading user-mode processes. Thus, the kernel-mode component 106 may receive notification of the load request for loading process 110.

At 132, the kernel-mode component 106 builds an APC for executing in the main thread of the process 110. In building the APC for the main thread in a given process component, such as process component 116, the kernel-mode component 106 may specify a kernel routine of the APC. The kernel routine may call instructions of the kernel-mode component 106 for allocating memory storing, in the allocated memory, instructions for loading the user-mode component 112. Further, the kernel routing may call instructions of the kernel-mode component 106 for setting, at 134, a pointer to a verification function of the control-flow protection mechanism of the OS to point to an alternate verification function. As mentioned in greater detail herein, the alternate verification function may be a function of the control-flow protection mechanism, of the user-mode component 112, or of another module. The alternate verification function returns an indication that a function call, such as a call to the APC, is permitted.

In addition to specifying the kernel routine of the APC, the kernel-mode component 106 may specify a user routine. When executed by the OS kernel APC dispatcher inside process 110, the user routine may call instructions stored in the allocated memory for loading the user-mode component 112.

In some implementations, after building the APC, the kernel-mode component 106 may store the APC in memory 114 and queue the APC to the main thread of process 110 via the OS kernel 104. While loading, the user-mode loader library component in process 110 may ask the OS kernel 104 whether there are any pending APCs, and may receive the APC built by the kernel-mode component 106. Upon receiving the APC, the OS kernel 104 may execute the kernel routine and user routine of the APC inside process 110. In various implementations, the kernel-mode component 106 may accomplish different security objectives specified by a configuration of the kernel-mode component 106 by controlling when the APC is provided or the manner in which the kernel routine and the user routine of the APC execute. In some implementations, the APC may be provided at different times in the loading of the process 110.

Upon receiving an APC, the main thread of the user-mode process 110 may execute the APC, first executing the kernel routine and then executing the user routine. As mentioned, the kernel routine calls instructions of the kernel-mode component 106. The user routine calls instructions stored by the kernel routine, which load, at 136, the user-mode component 112. In alternative implementations, the user routine may simply identify the user-mode component 112 by its name, and upon encountering the identification, a check is performed to determine whether the user-mode component 112 is a known DLL included in a list of known DLLs. Because the kernel-mode component 106 will have previously added the user-mode component 112 to the list of known DLLs, the answer will be affirmative, and the user-mode loader component will load the user-mode component 112. The thread in user-mode process 110 may repeat APC execution for each APC received.

In various implementations, when loaded, the user-mode component 112 first scans data associated with the process component 116 to identify, at 138, slack space 120 in the process component 116. The user-mode component 112 may identify the slack space 120 by comparing memory addresses of on-disk and in-memory instances of the process component 116. The user-mode component 112 may then store instructions comprising the trampoline 122 at a location in the identified slack space 120. Next, the user-mode component 112 hooks, at 140, one or more functions of the process component 116 by modifying a single instruction or set of instructions that make up a machine word 118 for each of the one or more functions. Such hooks may be atomic hooks and the single or multiple instructions 118 may for each function may each total exactly 8 bytes, and the modifications may comprise replacing all of the 8 bytes with a function call and an address of the trampoline 122. The bytes replaced may be stored by the user-mode component 112 to enable restoration. To modify instruction(s) 118, the user-mode component 112 may utilize an atomic compare and swap mechanism of the processor of the computing device to verify that the instruction(s) 118 match the instruction(s) identified by the kernel-mode component 106 and to prevent concurrent modification of the instruction(s).

In some implementations, following the loading of the user-mode process 110, the user-mode process 110 may execute. While executing, the user-mode process 110 may invoke the modified instruction(s) 118 of the process component 116. The modified instruction(s) 118, when executed, call, at 142, the trampoline 122 at the location in the slack space 120. Upon calling the trampoline 122, the trampoline 122 is executed. In some implementations, the process component 116 may include multiple modified instruction(s) 118 for multiple hooked functions, and these multiple modified instruction(s) 118 may all call the same trampoline 122. When called, the trampoline 122 may invoke, at 144, the redirect function 124 of the user-mode component 112.

The redirect function 124 may then, at 146, redirect to a hooking function 126 that corresponds to the hooked function which called the trampoline 122. Such redirecting may involve retrieving a return address from the call stack and removing it from the call stack and invoking a hooking function 126 associated with the return address. Because the modified instruction(s) 118 called the trampoline 122, the return address of those modified instruction(s) 118 is included in the call stack and can be used to redirect to the appropriate hooking function 126.

The hooking function 126 receives data associated with the hooked function and, at 148, provides the data to the kernel-mode component 106 for further processing.

In various implementations, the user-mode component 112 may restore the instruction(s) 118 to its/their original state when the user-mode component 112 is unloading. The user-mode component 112 may also reset the verification pointer to point to the verification function.

Example System

FIG. 2 illustrates a component level view of a computing device configured with a kernel-mode component of a security agent capable of injecting a user-mode component of that security agent to hook a user-mode process. As illustrated, computing device 200 comprises a memory 202 storing an OS kernel 204, a kernel-mode component 206, a user-mode component 208, and a user-mode process 210 with function(s) to receive atomic hook(s) 212 and slack space 214 that includes a location storing a trampoline 216. Also, computing device 200 includes processor(s) 218, a removable storage 220 and non-removable storage 222, input device(s) 224, output device(s) 226 and communication connections 228 for communicating with other computing devices 230.

In various embodiments, memory 202 is volatile (such as RAM), non-volatile (such as ROM, flash memory, etc.) or some combination of the two. The OS kernel 204 may be a kernel of any sort of OS, such as the OS kernel 104 described above in detail with respect to FIG. 1. The kernel-mode component 206 may be an example of the kernel-mode component 106 described above in detail with respect to FIG. 1. The user-mode component 208 may be an example of the user-mode component 112 described above in detail with respect to FIG. 1. The user-mode process 210 may be an example of the process 110 described above in detail with respect to FIG. 1. The atomic hook(s) 212 may be an example of the single instruction or set of instructions that make up a machine word 118 as atomically hooked at 140 by the user-mode component 112, described above in detail with respect to FIG. 1. The slack space 214 may be an example of the slack space 120 described above in detail with respect to FIG. 1. The trampoline 216 may be an example of the trampoline 122 described above in detail with respect to FIG. 1.

In some embodiments, the processor(s) 218 is a central processing unit (CPU), a graphics processing unit (GPU), or both CPU and GPU, or other processing unit or component known in the art.

Computing device 200 also includes additional data storage devices (removable and/or non-removable) such as, for example, magnetic disks, optical disks, or tape. Such additional storage is illustrated in FIG. 2 by removable storage 220 and non-removable storage 222. Non-transitory computer-readable media may include volatile and nonvolatile, removable and non-removable tangible, physical media implemented in technology for storage of information, such as computer readable instructions, data structures, program modules, or other data. System memory 202, removable storage 220 and non-removable storage 222 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 200. Any such non-transitory computer-readable media may be part of the computing device 200.

Computing device 200 also has input device(s) 224, such as a keyboard, a mouse, a touch-sensitive display, voice input device, etc., and output device(s) 226 such as a display, speakers, a printer, etc. These devices are well known in the art and need not be discussed at length here.

Computing device 200 also contains communication connections 228 that allow the computing device 200 to communicate with other computing devices 230.

Example Processes

FIGS. 3-6 illustrate example processes 300, 400, 500, and 600. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
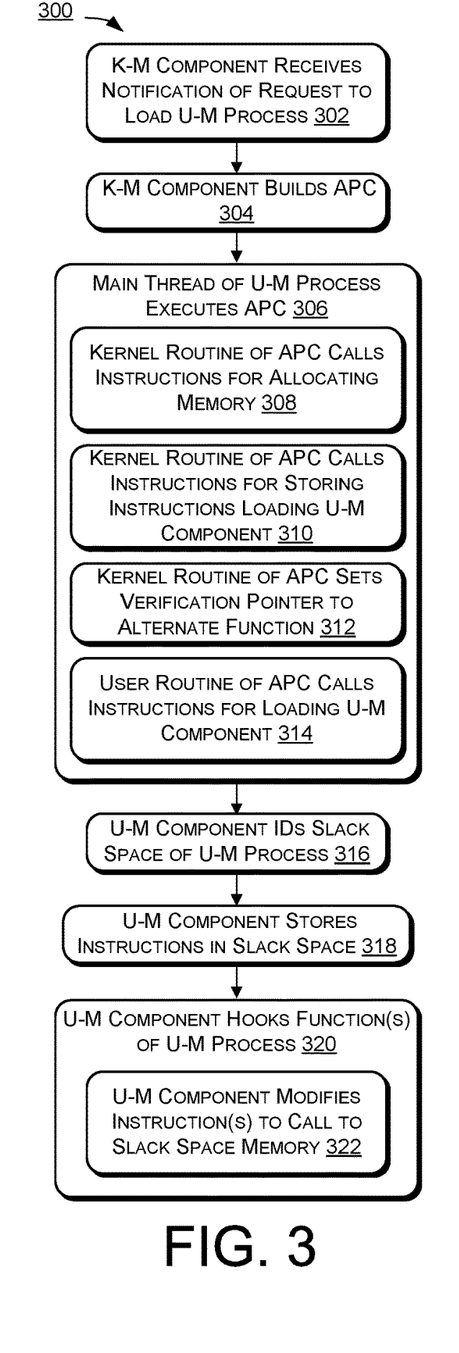
FIG. 3 illustrates an example process for a kernel-mode component to inject a user-mode component through an asynchronous procedure call (APC).

FIG. 3 illustrates an example process for a kernel-mode component to inject a user-mode component through an asynchronous procedure call (APC). The process 300 includes, at 302, receiving, by a kernel-mode component of a security agent, notification of loading of a user-mode process. The kernel-mode component may receive the notification from a callback interface of an operating system kernel of the computing device implementing the kernel-mode component.

At 304, the kernel-mode component may build an APC to be executed by the main thread of the user-mode process while the user-mode process is loading. The APC may include a kernel routine and a user routine. At 306, the main thread of the user-mode process executes the APC. At 308, executing the APC first involves invoking the kernel routine of the APC for allocating memory. At 310, executing the APC second involves invoking the kernel routine of the APC for storing, in the allocated memory, instructions for loading the user-mode component. At 312, executing the APC third involves invoking the kernel routine of the APC for bypassing a control-flow protection mechanism, including setting a pointer to a verification function of the control-flow protection mechanism to point to an alternate verification function. At 314, executing the APC fourth involves invoking the user routine of the APC, which calls the instructions stored in the allocated memory to load of the user-mode component. The user-mode component may be included in a list of known library components (e.g., known DLLs).

At 316, the user-mode component identifies slack space in the user-mode process.

At 318, the user-mode component stores, in the identified slack space, instructions for, when called, invoking the user-mode component. Such stored instructions may be a trampoline. In some implementations, invoking the user-mode component may include invoking a redirect function of the user-mode component.

At 320, the user-mode component then hooks one or more functions of the user-mode process, such as function(s) of a 64-bit system library component of the process. The function(s) may be associated with one or more of a user-mode memory allocation, setting a thread context in user-mode, or any system call which cannot be hooked from kernel-mode. At 320, the hooking may be atomic hooking and may include modifying a single instruction or set of machine-word sized instructions of each of the function(s) to specify a call to the instructions stored in the slack space. The instruction(s) may be total eight bytes and may be modified by using an atomic compare and swap mechanism of a processor.

Figure 4:
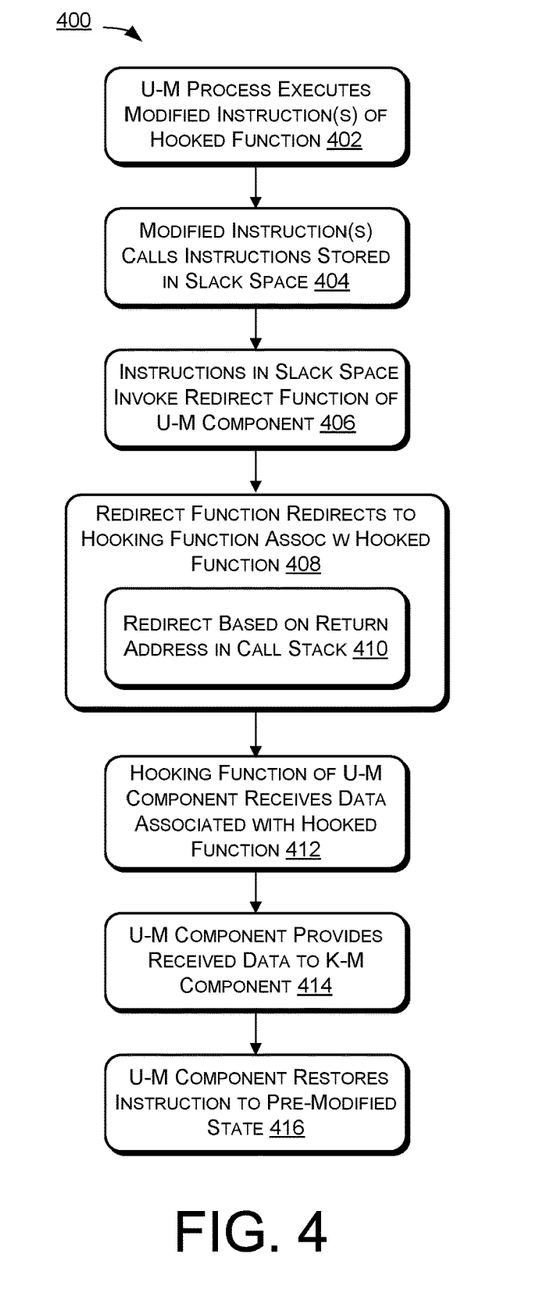
FIG. 4 illustrates an example process for a user-mode component to receive data associated with a function of a user-mode process through a hook of that function and to provide the hooked data to a kernel-mode component.

FIG. 4 illustrates an example process for a user-mode component to receive data associated with a function of a user-mode process through a hook of that function and to provide the hooked data to a kernel-mode component. The process 400 includes, at 402, the user-mode process executing modified instruction(s) of the function, the modified instruction(s) serving as the hook. In some implementations, the function may be a function of a 64-bit system library component of the user-mode process.

At 404, when executed, the modified instruction(s) call instructions stored at a location in slack space of the user-mode process. As mentioned above, such instructions may be a trampoline.

At 406, the instructions stored in the slack space invoke a redirect function of a user-mode component of a security agent.

At 408, the redirect function of the user-mode component redirects to a hooking function of the user-mode component, the hooking function being associated with the hooked function. At 410, the redirect function redirects based on a return address retrieved from the call stack, the return address being associated with a memory location of the modified instruction(s). In some implementations, the redirect function may remove the return address from the call stack.

At 412, the hooking function of the user-mode component receives data associated with the hooked function.

At 414, the user-mode component provides the received data to a kernel-mode component of the security agent.

At 416, when unloading, the user-mode component restores the modified instruction(s) to its/their original state.

Figure 5:
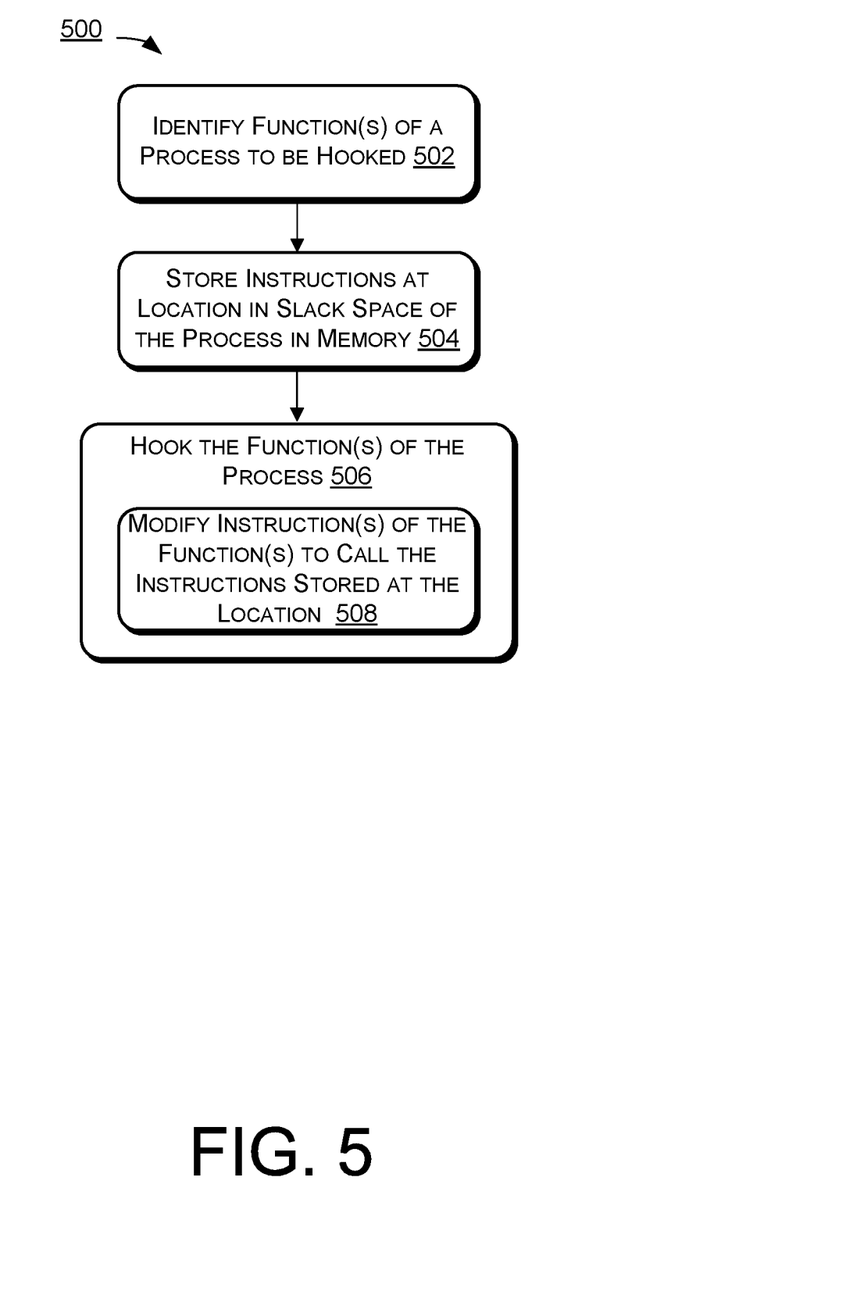
FIG. 5 illustrates an example process for storing instructions in slack space of a user-mode process and hooking a function of the user-mode process by modifying the function to call the stored instructions.

FIG. 5 illustrates an example process for storing instructions in slack space of a user-mode process and hooking a function of the user-mode process by modifying the function to call the stored instructions. The process 500 includes, at 502, identifying, by a computing device, one or more functions of a process to be hooked.

At 504, the computing device stores instructions at a location in slack space of the process in memory.

At 506, the computing device hooks the one or more functions, including, at 508 modifying a single instruction or a set of instructions for each function of the one or more functions to call the instructions stored at the location. When the instructions are executed responsive to a call from a function of the one or more functions, the instructions invoke a security agent to receive data associated with that function.

Figure 6:
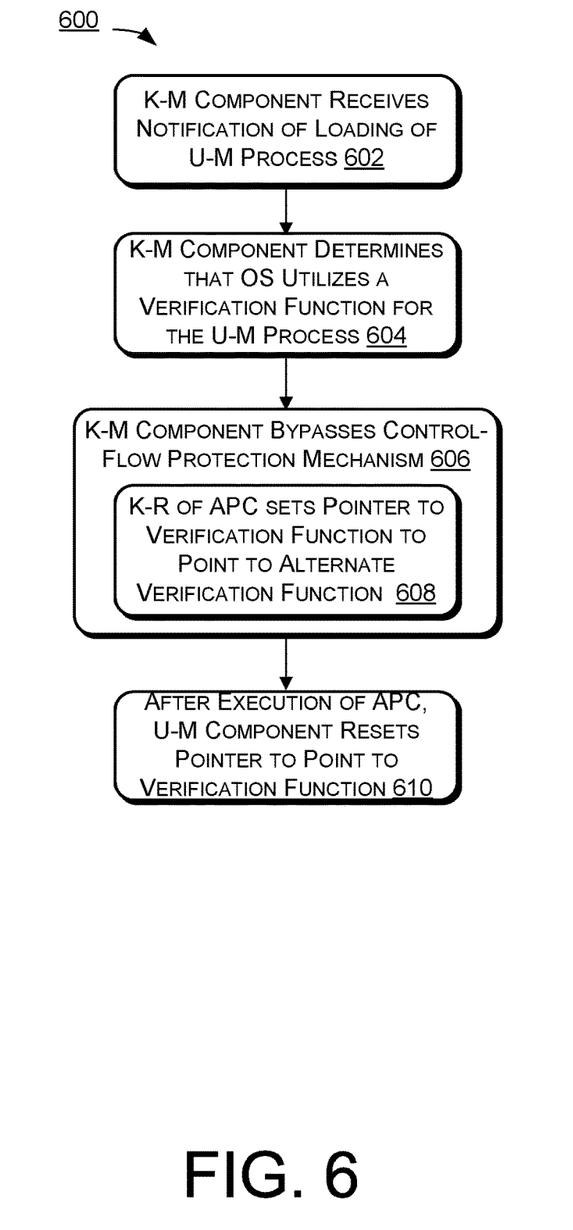
FIG. 6 illustrates an example process for bypassing a control-flow protection mechanism of an operating system.

FIG. 6 illustrates an example process for bypassing a control-flow protection mechanism of an operating system. The process 600 includes, at 602, receiving, by a security agent (e.g., by a kernel-mode component of the security agent), notification of a request to load a user-mode process.

At 604, the security agent determines that the operating system utilizes a verification function of the control-flow protection mechanism for the process.

At 606, the security agent bypasses the control-flow protection mechanism, the bypassing including, at 608, setting a pointer to the verification function to point to an alternate verification function. In some implementations, both the verification function and the alternate verification function are functions of the control-flow protection mechanism and the control-flow protection mechanism utilizes the verification function for processes compiled with one or more types of compilers and the alternate verification function for processes not compiled with the one or more types of compilers. In other implementations, the alternate verification function is a function of the security agent. In some implementations, when called, the alternate verification function returns an indication that a call to the APC is permitted.

At 610, after execution of an asynchronous procedure call (APC) by the process, the security agent resets the pointer to point to the verification function.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a processor; and
memory coupled to the processor, the memory storing a security agent configured to be operated by the processor to monitor activity on the system as part of a security service, the security agent including:
a kernel-mode component configured to receive notification from an operating system of the system of loading of a user-mode process by the system, and in response to the notification, to build an asynchronous procedure call (APC) to be executed by a main thread of the user-mode process, and to queue the APC to the main thread of the user-mode process; and
a user-mode component associated with the kernel-mode component and configured to be operated by the processor to identify slack space in the user-mode process, to store trampoline instructions in the slack space, and to hook a function of the user-mode process,
wherein the APC includes:
a kernel routine which calls first instructions for allocating memory and for storing, in the allocated memory, second instructions for loading the user-mode component, and
a user routine which calls the second instructions for loading the user-mode component,
wherein the user-mode component, when loaded responsive to the user routine, hooks the function of the user-mode process by modifying a single instruction or set of machine-word sized instructions associated with the function of the user-mode process such that, when executed, the single instruction or set of machine-word sized instructions calls the trampoline instructions stored in the slack space,
wherein the trampoline instructions, when executed, causes the user-mode component to receive data associated with the function of the user-mode process and to provide the data to the kernel-mode component for purposes of monitoring, by the kernel-mode component, the activity on the system as part of the security service, and
wherein the trampoline instructions, when executed, invoke a redirect function of the user-mode component, the redirect function redirecting to a hooking function of the user-mode component which corresponds to the function of the user-mode process.

2. The system of claim 1, wherein the function of the user-mode process is associated with one of a user-mode memory allocation, setting a thread context in user-mode, or any system call which cannot be hooked from kernel-mode.

3. The system of claim 1, wherein the function of the user-mode process is a function of a 32-bit system library component of the user-mode process on 32-bit devices, or a 64-bit system library component of the user-mode process on 64-bit devices.

4. The system of claim 1, wherein the kernel-mode component is configured to, responsive to receiving the notification, bypass a control-flow protection mechanism by setting a pointer to a verification function of the control-flow protection mechanism to point to an alternate verification function.

5. The system of claim 1, wherein the user-mode component is configured to restore an original version of the single instruction or the set of machine-word sized instructions upon unloading.

6. The system of claim 1, wherein the single instruction or the set of machine-word sized instructions are eight bytes and the hooking comprises atomically hooking the function.

7. The system of claim 1, wherein the redirect function redirects based on a return address in a call stack, the return address being associated with the function.

8. A computer-implemented method comprising:
receiving, by a kernel-mode component of a security agent on a computing device, a notification from an operating system of the computing device of loading of a user-mode process by the computing device;
in response to the notification, building, by the kernel-mode component, an asynchronous procedure call (APC) to be executed by a main thread of the user-mode process, wherein the APC includes:
a kernel routine which calls first instructions for allocating memory and for storing, in the allocated memory, second instructions for loading a user-mode component of the security agent, and
a user routine which calls the second instructions for loading the user-mode component;
queuing, by the kernel-mode component, the APC to the main thread of the user-mode process;
loading, by the computing device, the user-mode component of the security agent based on execution of the APC by the main thread of the user-mode process;
identifying, by the user-mode component, one or more functions of the user-mode process to be hooked;
identifying, by the user-mode component, slack space associated with the user-mode process in memory of the computing device;
storing, by the user-mode component, trampoline instructions at a location in the slack space; and
hooking, by the user-mode component, the one or more functions of the user-mode process by modifying a single instruction or a set of instructions for each function of the one or more functions, such that, when executed, the single instruction or the set of instructions calls the trampoline instructions stored at the location in the slack space,
wherein the trampoline instructions, when executed responsive to a call from a function of the one or more functions based on the modifications to the single instruction or the set of instructions, invoke a redirect function of the user-mode component, the redirect function redirecting to a hooking function of the user-mode component which corresponds to the one or more functions of the user-mode process, and invoke the kernel-mode component of the security agent to receive data associated with the function of the one or more functions of the user-mode process.

9. The computer-implemented method of claim 8, further comprising, responsive to receiving the notification, bypassing a control-flow protection mechanism, including setting a pointer to a verification function of the control-flow protection mechanism to point to an alternate verification function.

10. The computer-implemented method of claim 8, wherein the user-mode component provides the data associated with the function of the one or more functions to the kernel-mode component of the security agent when the trampoline instructions are executed.

11. The computer-implemented method of claim 8, further comprising restoring, by the user-mode component, an original version of the single instruction or the set of instructions upon unloading.

12. The computer-implemented method of claim 8, wherein the single instruction or set of instructions for each function of the one or more functions are eight bytes and the hooking comprises atomically hooking the one or more functions.

13. The computer-implemented method of claim 8, wherein the one or more functions comprise multiple functions, the multiple functions all, when hooked, calling the same trampoline instructions.

14. The computer-implemented method of claim 8, wherein the redirect function redirects based on a return address in a call stack, the return address being associated with the function of the one or more functions.

15. A non-transitory computer-readable medium having a plurality of programming instructions of a security agent stored thereon which, when executed by a computing device, cause the computing device to perform operations comprising:
   receiving, by a kernel-mode component of the security agent, a notification from an operating system of the computing device of a loading of a user-mode process by the operating system;
   in response to the notification, building, by the kernel-mode component, an asynchronous procedure call (APC) to be executed by a main thread of the user-mode process, wherein the APC includes:
      a kernel routine which calls first instructions for allocating memory and for storing, in the allocated memory, second instructions for loading a user-mode component of the security agent, and
      a user routine which calls the second instructions for loading the user-mode component;
   queuing, by the kernel-mode component, the APC to the main thread of the user-mode process;
   loading, by the computing device, the user-mode component of the security agent based on execution of the APC by the main thread of the user-mode process;
   identifying, by the user-mode component, one or more functions of the user-mode process to be hooked;
   identifying, by the user-mode component, slack space associated with the user-mode process in memory of the computing device;
   storing, by the user-mode component, trampoline instructions at a location in the slack space; and
   hooking, by the user-mode component, the one or more functions of the user-mode process by modifying a single instruction or a set of instructions for each function of the one or more functions, such that, when executed, the single instruction or the set of instructions calls the trampoline instructions stored at the location in the slack space,
   wherein the trampoline instructions, when executed responsive to a call from a function of the one or more functions based on the modifications to the single instruction or the set of instructions, invoke a redirect function of the user-mode component, the redirect function redirecting to a hooking function of the user-mode component which corresponds to the one or more functions of the user-mode process, and invoke the kernel-mode component of the security agent to receive data associated with the function of the one or more functions of the user-mode process.

16. The non-transitory computer-readable medium of claim 15, wherein the operations further comprise, responsive to receiving the notification, bypassing a control-flow protection mechanism, including setting a pointer to a verification function of the control-flow protection function to point to an alternate verification function.

17. The non-transitory computer-readable medium of claim 15, wherein the user-mode component provides the data associated with the function of the one or more functions to the kernel-mode component of the security agent when the trampoline instructions are executed.

18. The non-transitory computer-readable medium of claim 15, wherein the operations further comprise restoring, by the user-mode component, an original version of the single instruction or the set of instructions upon unloading.

19. The non-transitory computer-readable medium of claim 15, wherein the redirect function redirects based on a return address in a call stack, the return address being associated with the function of the one or more functions.

20. The non-transitory computer-readable medium of claim 15, wherein the one or more functions are associated with one of a user-mode memory allocation, setting a thread context in user-mode, or any system call which cannot be hooked from kernel-mode.

* * * * *